United States Patent [19]
Ito

[11] Patent Number: 6,006,786
[45] Date of Patent: Dec. 28, 1999

[54] VALVED DISCHARGE MECHANISM FOR FLUID DISPLACEMENT APPARATUS

[75] Inventor: Shigeru Ito, Gunma, Japan

[73] Assignee: Sanden Corporation, Gunma, Japan

[21] Appl. No.: 08/937,601

[22] Filed: Sep. 29, 1997

[30] Foreign Application Priority Data

Oct. 1, 1996 [JP] Japan .................................. 8-260463

[51] Int. Cl.⁶ .................................................. F16K 15/16
[52] U.S. Cl. ........................... 137/857; 137/856; 137/855
[58] Field of Search ................... 137/855, 856, 137/857, 858

[56] References Cited

U.S. PATENT DOCUMENTS

| | | | |
|---|---|---|---|
| 36,863 | 11/1862 | Sewell | 137/857 |
| 157,791 | 12/1874 | Cameron | 137/856 |
| 939,549 | 11/1909 | Reineking | 137/856 |
| 1,375,555 | 4/1921 | Brown | 137/857 |
| 1,614,124 | 1/1927 | Hansen | 137/857 |
| 2,118,356 | 5/1938 | Money | 137/857 |
| 2,151,746 | 3/1939 | Cody | 137/856 |
| 2,160,401 | 5/1939 | Engelman . | |
| 2,996,155 | 8/1961 | Priesemuth | 137/857 |
| 3,939,867 | 2/1976 | Lundvik et al. | 137/856 |
| 4,218,407 | 8/1980 | Robertson | 137/857 |
| 4,235,206 | 11/1980 | Boyesen | 137/857 |
| 4,257,458 | 3/1981 | Kondo et al. | 137/856 |
| 4,599,978 | 7/1986 | Kamata et al. | 137/856 |
| 4,628,963 | 12/1986 | Ishijima et al. | 137/857 |
| 4,696,263 | 9/1987 | Boyesen | 137/855 |
| 5,203,686 | 4/1993 | Scheldorf et al. . | |
| 5,370,088 | 12/1994 | Nakamura | 137/856 |
| 5,380,176 | 1/1995 | Kikuchi et al. . | |
| 5,647,395 | 7/1997 | Hashimoto et al. | 137/856 |

FOREIGN PATENT DOCUMENTS

| | | |
|---|---|---|
| 678570 | 8/1939 | Germany . |
| 52-71732 | 6/1977 | Japan . |
| 650642 | 2/1951 | United Kingdom . |

*Primary Examiner*—Denise L. Ferensic
*Assistant Examiner*—Joanne Y. Kim
*Attorney, Agent, or Firm*—Baker & Botts, LLP

[57] ABSTRACT

A discharge valve assembly for use in a fluid displacement apparatus having a suction chamber and a compression chamber on one side of a valve plate, a discharge chamber on the other side of said valve plate, and a passage which is formed in the valve plate extending between said compression chamber and the discharge chamber and has an open end through which discharge fluid flows. The discharge valve assembly comprises an elastic valve member disposed on the valve plate. One end of the valve member is secured to the valve plate. The elastic valve member is capable of bending to open and close the passage. A stabilizing device is disposed on the elastic valve member for stabilizing movement of the elastic valve member. Thereby, a valved discharge mechanism, in a fluid displacement apparatus for use in an automobile air conditioning system, can effectively reduce the vibration caused by a discharge valve assembly, reduce the propagation of noise to a passenger compartment of a vehicle, and prolong the life of the valve member.

13 Claims, 5 Drawing Sheets

VALVED DISCHARGE MECHANISM FOR FLUID DISPLACEMENT APPARATUS

BACKGROUND OF THE INVENTION

1. Field of Invention

The present invention relates to a valved discharge mechanism for a fluid discharge mechanism of a refrigerant compressor used in an automotive air conditioning system.

2. Description of the Related Art

Valved discharge mechanisms for refrigerant compressors are known in the art. For example, FIGS. 1 and 2 depict a discharge valve mechanism used in a refrigerant compressor as described in U.S. Pat. No. 5,120,205 to Ban et al. As disclosed therein, a refrigerant compressor includes a compressor housing defining a compression chamber in which successive strokes of intake, compression, and discharge of a refrigerant gas are repeatedly performed. The compressor further includes housing 10 comprising front end plate 11 and cup-shaped casing 12, which is disposed on a rear surface of front end plate 11. Opening 111 is formed in a center of front end plate 11 for the penetration of drive shaft 17. Annular projection 112 is formed on the rear surface of front end plate 11 and faces cup-shaped casing 12. An outer peripheral surface of annular projection 112 fits into an inner wall surface of an opening portion of cup-shaped casing 12. Cup-shaped casing 12 is fixed on the rear end surface of front end plate 11 by a fastening member, such a plurality of bolts (not shown), so that the opening portion of cup-shaped casing 12 is covered by front end plate 11. O-ring member 14 is disposed between the outer peripheral surface of annular projection 112 and an inner wall surface of cup-shaped casing 12, to form a seal between the surfaces of front end plate 11 and cup-shaped casing 12.

Front end plate 11 has an annular sleeve portion 18 projecting from a front surface thereof for surrounding drive shaft 17 to define a shaft seal cavity. Drive shaft 17 is rotatably supported by annular sleeve portion 18 through bearing 16 disposed within a front end portion of annular sleeve portion 18. Disk portion 21 is formed at an inner end portion of drive shaft 17. Disk portion 21 is rotatably supported by front end plate 11 through bearing 22 which is disposed within opening 111 of front end plate 11. Shaft seal assembly 15 is assembled on drive shaft 17 within the shaft seal cavity of annular sleeve portion 18. Pulley 20 is rotatably supported by annular sleeve portion 18 through bearing 19, which is disposed on an outer surface of annular sleeve portion 18. Electromagnetic coil 23 is fixed on the outer surface of annular sleeve portion 18 by support plate 221 and is received in an annular cavity of pulley 20. Armature plate 24 is elastically supported by an outer end portion of drive shaft 17 which extends from annular sleeve portion 18. A magnetic clutch comprising pulley 20, electromagnetic coil 23, and armature plate 24 is thereby formed.

Drive shaft 17 is driven by an external power source, for example, the engine of an automobile, through a force-transmitting means, such as the magnetic clutch described above. Fixed scroll member 26, orbiting scroll member 27, crank-type driving mechanism 25 of orbiting scroll member 26, and rotation preventing mechanism 28 of orbiting scroll member 27 are disposed in an inner chamber of cup-shaped casing 12. Fixed scroll member 26 includes circular end plate 261, spiral element 262, affixed to and extending from a front surface of circular end plate 261, and a plurality of internally threaded bosses 265 projecting axially from a rear end surface of circular end plate 261. An end surface of each boss 265 is seated on an inner surface of end plate portion 121 of cup-shaped casing 12 and is fixed to end plate portion 121 by bolts 29.

Fixed scroll member 26 is fixedly disposed within cup-shaped casing 12. Circular end plate 261 of fixed scroll member 26 partitions the inner chamber of cup-shaped casing 12 into discharge chamber 36 and suction chamber 41 by seal ring 42 which is disposed between an outer peripheral surface of circular end plate 261 and the inner wall surface of cup-shaped casing 12. Orbiting scroll member 27 is disposed within suction chamber 41 and comprises circular end plate 271 and spiral element 272 affixed to and extending from a front surface of circular end plate 271. Spiral element 272 of orbiting scroll 27 and spiral element 262 of fixed scroll 26 interfit with an angular and radial offset. At least one pair of fluid pockets are thereby defined between spiral elements 262 and 272. Orbiting scroll member 27 is connected to crank-type driving mechanism 25 and rotation preventing mechanism 28 which effect the orbital radius RO (not shown) by the rotation of drive shaft 17, to thereby compress fluid that is passing through the compressor. Each spiral element 262 and 272 is provided with groove 30 formed on an axial end surface thereof. Seal element 301 is loosely fitted within groove 30. Sealing between the axial end surface of each spiral element 262 and 272 and a respective surface of an opposite end plate is effected by seal element 301.

As described above, when orbiting scroll member 27 is driven, line contacts between spiral elements 262 and 272 shift along the spiral curved surfaces of spiral elements 262 and 272 so that fluid pockets move to the center of spiral elements 262 and 272.

Therefore, fluid or refrigerant gas that is introduced into suction chamber 41 from an external fluid circuit through inlet port 52 on cup-shaped casing 12 is drawn into the fluid pockets that are formed between spiral elements 262 and 272. As orbiting scroll member 27 orbits, fluid in the fluid pockets moves to the center of spiral elements 262 and 272 with a consequent reduction in volume. Compressed fluid is discharged into discharge chamber 36 from the fluid pockets at the center of spiral elements 262 and 272 through discharge hole 263, which is formed in circular end plate 262 of fixed scroll member 26 at a position near the center of spiral element 262. The compressed fluid is discharged from discharge chamber 36 though outlet port 53 formed on cup-shaped casing 12 to an external fluid circuit, e.g., a cooling circuit.

Compression chamber 41 communicates with discharge chamber 36 through discharge hole 263. The discharge valve assembly includes discharge reed valve 31 and valve retainer 32, both of which are secured to a rear surface 264 of fixed scroll 26 by fixing bolt 51. Valve seat 264a is integrally formed in rear surface 264 of circular end plate 261 of fixed scroll 26 around discharge hole 263. Discharge reed valve 31, which is made of an elastic material, regulates the flow of the refrigerant gas and remains seated against valve seat 264a of rear surface 264 without an air gap when the compressor is not in operation.

Valve retainer 32 limits the bending movement of discharge reed valve 31 in a direction away from rear surface 264. Discharge reed valve 31 bends away from rear surface 264, opening discharge hole 263 and establishing a communication path between compression chamber 41 and discharge chamber 36. Discharge reed valve 31 has a spring constant which allows discharge reed valve 263 to keep discharge hole 263 closed until the pressure in the compression chamber reaches a predetermined value. Specifically, when the pressure differential between compression chamber 41, which is filled with compression gas caused by spiral elements 26 and 27, and discharge chamber 36 increases, the discharge reed 31 is bent away from rear surface 264, clearing discharge hole 263, and allowing the discharge of compressed gas from compression chamber 41 to discharge chamber 36. As the gas is discharged, the pressure differential between decreases, allowing discharge reed valve 31 to straighten and close discharge hole 263 while preventing the backflow of gas from discharge chamber 36 to compression chamber 41. Discharge reed valve 31 repeats the bending and straightening movement to open and close discharge hole 263 in a short period of time.

The elastic modulus of discharge reed valve 31 causes discharge reed valve 31 to strike valve seat 264a when it straightens. This striking generates additional vibration and noise in the compressor. Further, the repeated striking causes fatigue in discharge reed valve 31.

The operation of the compressor also causes discharge reed valve 31 to vibrate. This vibration leads to pulsed fluid delivery through discharge hole 263 during the operation of the compressor, in addition to other disadvantages.

SUMMARY OF THE INVENTION

It is an object of the present invention to provide a valve assembly suitable for use in a fluid displacement apparatus of an automobile air conditioning system having a valved discharge mechanism which can effectively reduce the vibration caused by a discharge valve assembly and reduce the propagation of offensive noise to a passenger compartment of a vehicle.

It is a further object of the present invention to provide a valve assembly having a valved discharge mechanism in which the life of a discharge reed valve is prolonged.

According to the present invention, a discharge valve assembly is used in a fluid displacement apparatus which has a suction chamber and a compression chamber on one side of a valve plate, a discharge chamber on the other side of the valve plate, and a passage which is formed in the valve plate extending between the compression chamber and the discharge chamber and has an open end through which discharge fluid flows. The discharge valve assembly comprises an elastic valve member disposed on the valve plate. One end of the discharge valve is secured to the valve plate. The elastic valve member is capable of bending to open and close the passage. A stabilizing device is disposed on the elastic valve member for stabilizing movement of the elastic valve member.

DETAILED DESCRIPTION OF THE PREFERRED EMBODIMENTS

Figure 1:
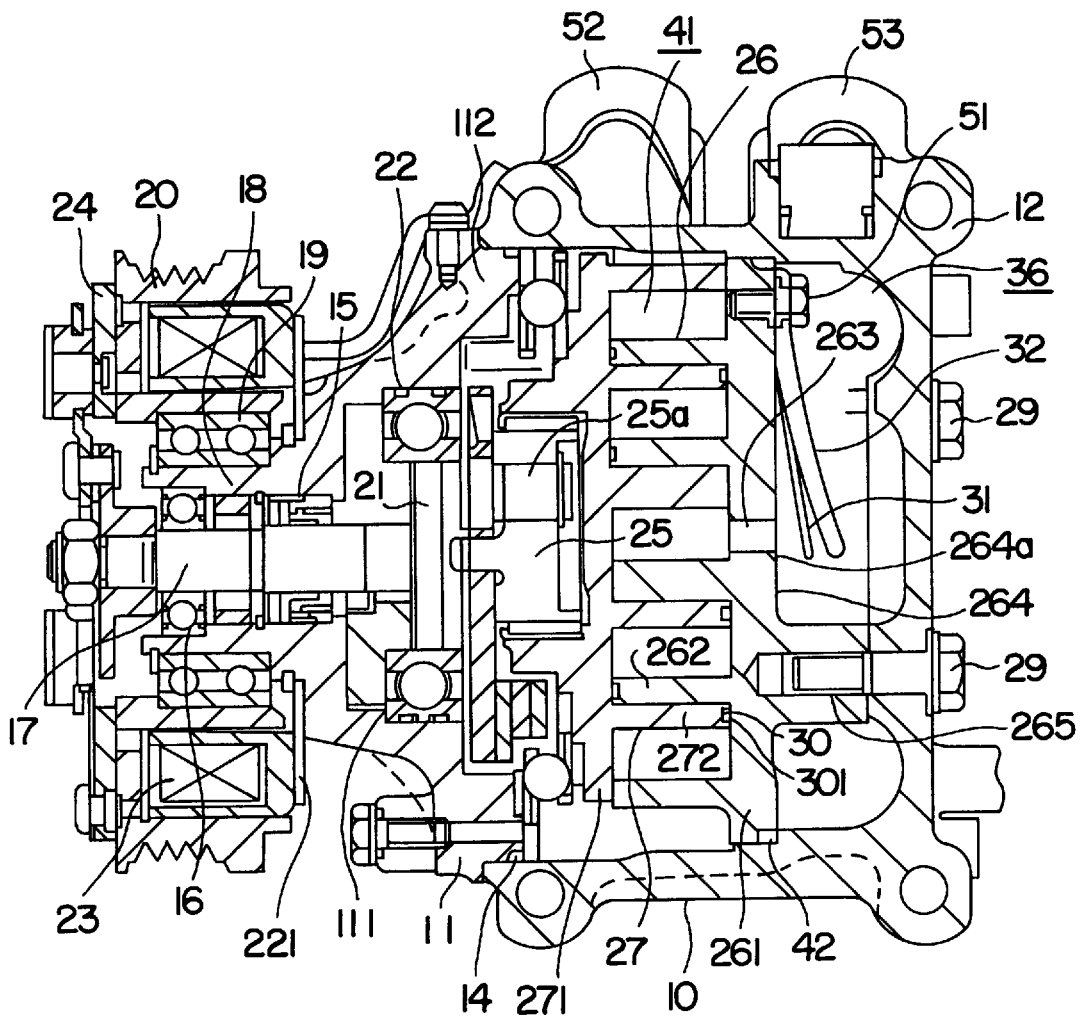
FIG. 1 is a longitudinal sectional view of a scroll type refrigerant compressor in accordance with the prior art.
Figure 2:
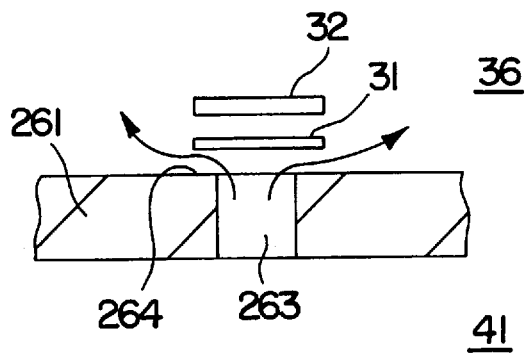
FIG. 2 is an enlarged sectional view of a discharge valve assembly in accordance with the prior art.

Several embodiments of the present invention are illustrated in FIGS. 3–9 in which the same numerals are used to denote elements which correspond to similar elements depicted in FIGS. 1 and 2 and described above. A detailed explanation of these elements and their characteristics are therefore omitted from this section.

Figure 3:
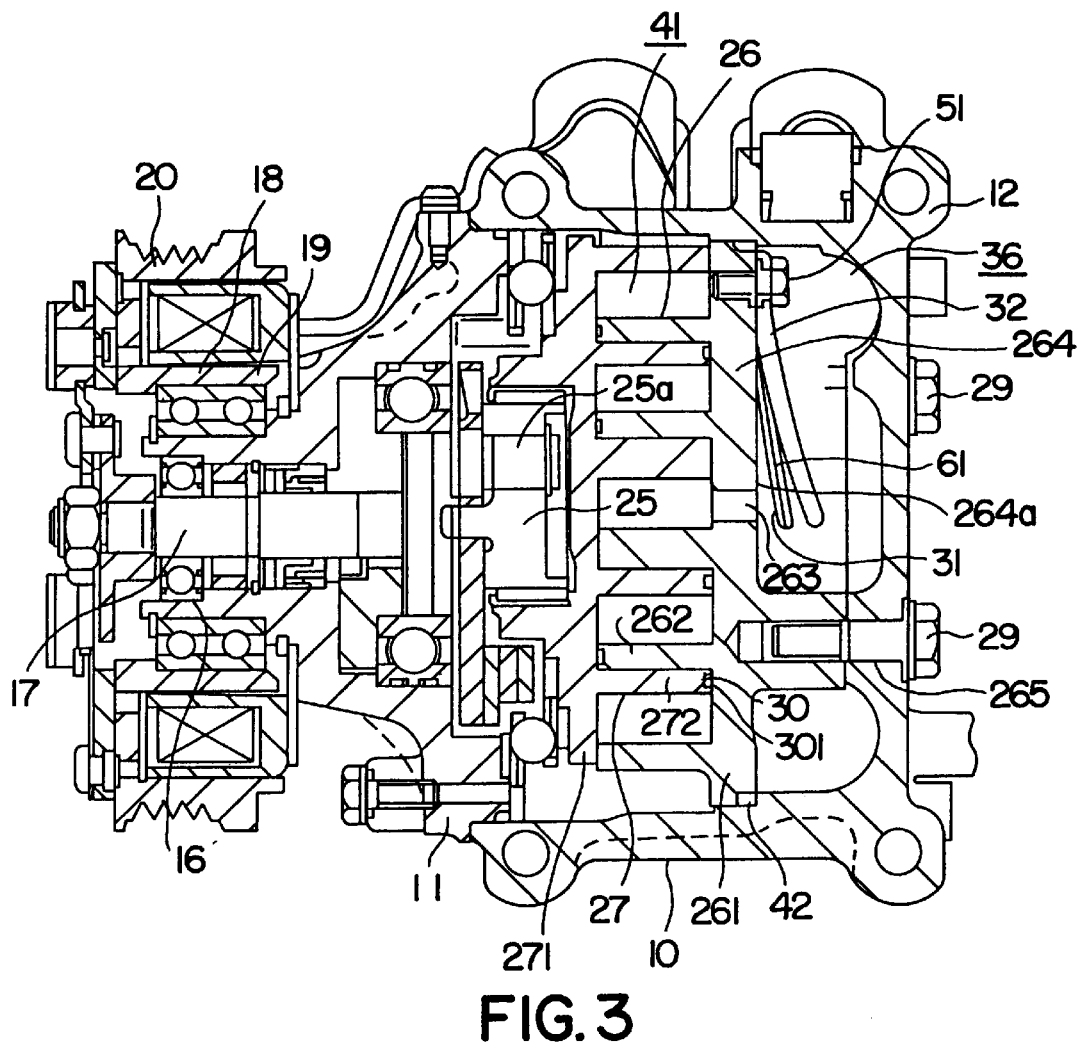
FIG. 3 is a longitudinal sectional view of a scroll type of refrigerant compressor in accordance with a first embodiment of the present invention.
Figure 4:
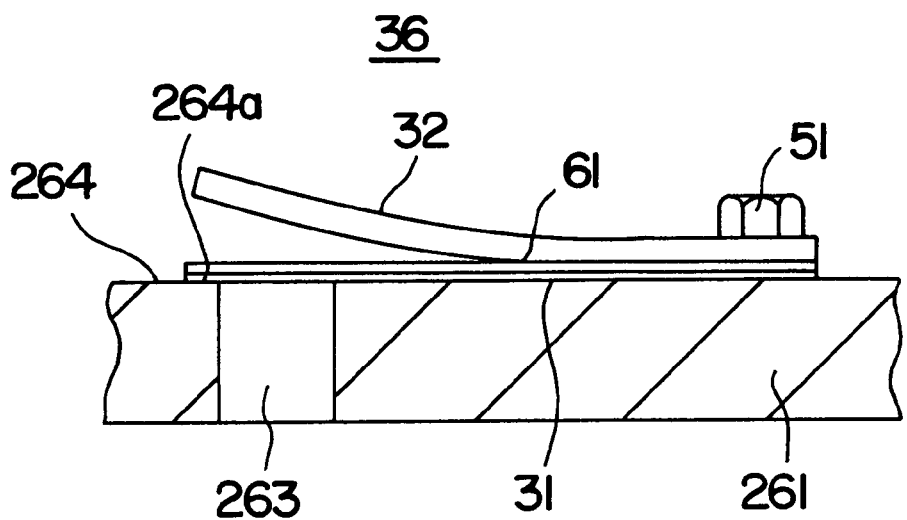
FIG. 4 is an enlarged sectional view of a discharge valve assembly in accordance with the first embodiment of the present invention.

Referring to FIGS. 3 and 4, the discharge valve assembly includes supporting reed member 61 disposed between retainer 32 and discharge reed valve 31. Supporting reed member 61 is secured, with retainer 32 and discharge reed valve 31, to a rear surface 264 of fixed scroll 26 by fixing bolt 51. One surface of supporting reed member 61 is in contact with one surface of discharge reed valve 31 so that supporting reed member 61 cooperates with discharge reed valve 31. Discharge reed valve 31 and supporting reed member 61 slide against each other in a direction parallel to the contact surface. Supporting reed member 61 is made of a material, such as steel, and has a shape and a thickness similar to that of discharge reed valve 31. The materials, shapes, and thicknesses of both discharge reed valve 31 and supporting reed member 61 are chosen so that the spring constants of discharge reed valve 31 and supporting reed member 61 have suitable values to enhance the cooperation of the discharge reed valve 31 and the supporting reed member 61.

Figure 5:
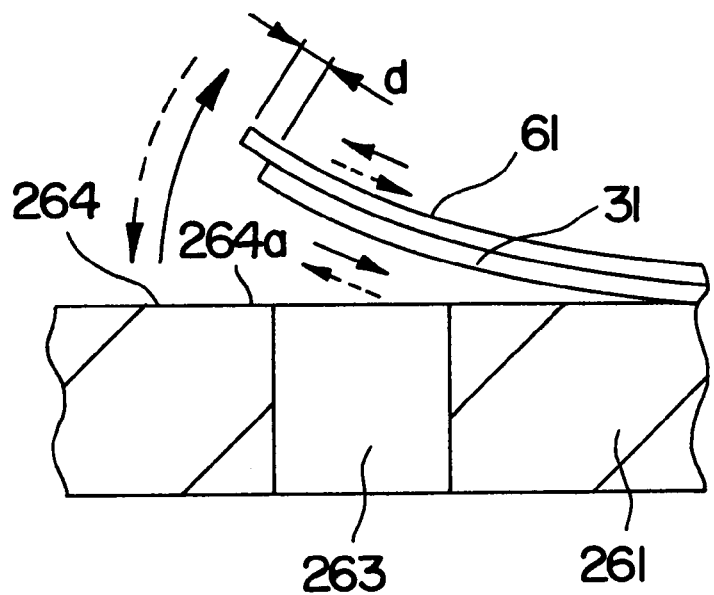
FIG. 5 is a detail sectional view of the discharge valve assembly during operation in accordance with the first embodiment of the present invention.

FIG. 5 depicts a situation where discharge reed valve 31 and supporting reed member 61 have a discrepancy "d" in position of edge portions thereof when discharge reed valve 31 and supporting reed member 61 have a maximum opening displacement during operation. Discharge reed valve 31 and supporting reed member 61 move in the direction shown by the solid line in FIG. 5 when discharge reed valve 31 opens, and in the direction shown by the broken line when discharge reed valve 31 closes. More precisely, supporting reed member 61 slides relative to discharge reed valve 31 with a distance "d."

In the operation of the discharge valve assembly, when the pressure differential between compression chamber 41, which is filled with the compression gas, and discharge chamber 36 increases, discharge reed valve 31 bends away from rear surface 264 opening discharge hole 263 and discharging compression gas from compression chamber 41 into discharge chamber 36. The velocity of refrigerant gas that is discharged is high. Therefore, "negative" pressure is applied to the rear surfaces of supporting reed member 61 and discharge reed valve 31 to support reed member 61 and discharge reed valve 31 and to close discharge hole 263.

In this arrangement, lubricating oil, which is included in the refrigerant gas, enters a space created between one end surface of discharge reed valve 31 and one end surface of supporting reed member 61. Friction force, which is caused by the sliding of discharge reed valve 31 and supporting reed member 61, or by the viscosity of the lubricating oil, dampens the movement of discharge reed valve 31 against the force of the gas, the spring force, and the negative pressure that is applied to discharge reed valve 31. Therefore, the damping force prevents discharge reed valve 31 from vibrating during the operation of the compressor, and from striking valve seat 264a of circular end plate 261 when it closes.

Accordingly, the present configuration of the discharge assembly prevents the compressor from vibrating and generating noise. The subsequent elimination of vibration in reed valve 31 prevents the compressor from having a pulsed fluid delivery through discharge hole 263. Additionally, the elimination of vibration could also prolong the life of the discharge reed valve assembly.

Figure 6:
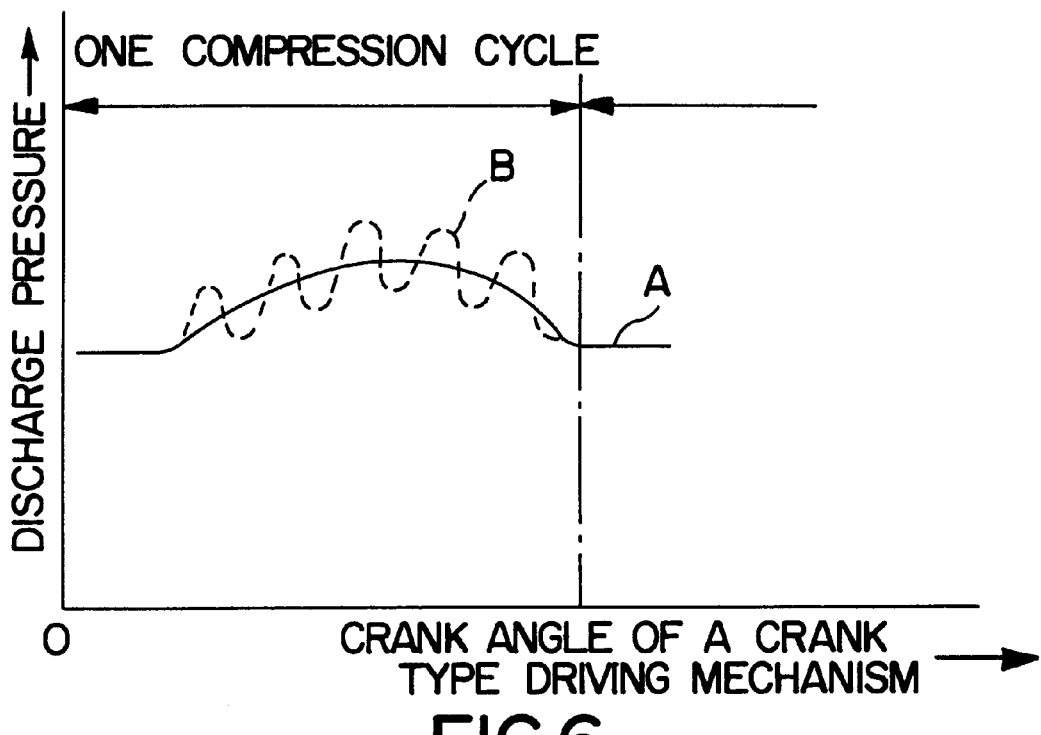
FIG. 6 is a graphical illustration of the difference magnitude of pulsation between the prior art and the present invention related to pressure and crank angle.

Referring to FIG. 6, solid line "A" represents the relationship of the discharge pressure in the discharge chamber to a rotation angle of crank pin 25a provided in driving mechanism 25 in the first embodiment of the present invention. Broken line "B" represents the relationship of discharge pressure in the discharge chamber to the rotation angle of crank pin 25a of the prior art. Thus, the discharge pressure in discharge chamber 36 causes pulsation in the valve assembly of the compressor of the prior art. In contrast, the discharge pressure does not cause pulsation in the discharge value of the present invention because discharge reed valve 31 opens and closes without any vibration.

Figure 7:
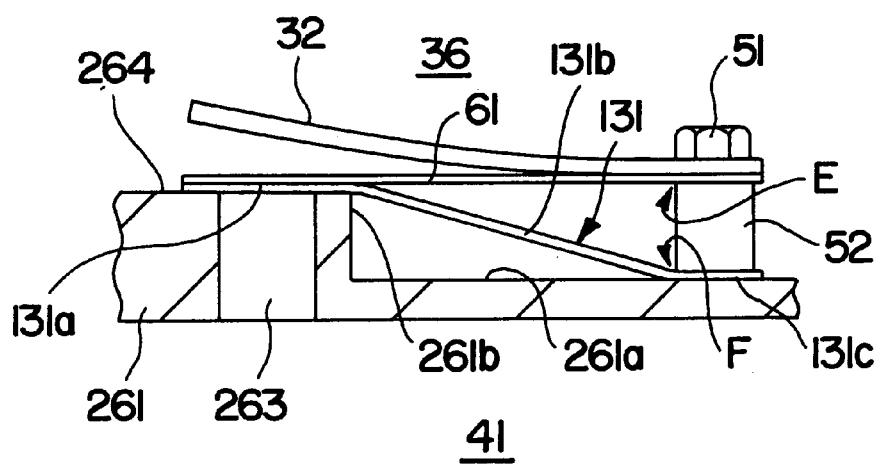
FIG. 7 is an enlarged sectional view of a discharge valve assembly in accordance with a second embodiment of the present invention.

FIG. 7 illustrates a second embodiment of the present invention. Circular end plate 261 of fixed scroll 26 includes recessed portion 261a extending from an area adjacent to discharge hole 263 to the periphery of fixing bolt 51. The discharge reed valve assembly includes a discharge reed valve 131, supporting reed member 61, and retainer 32, all of which are secured to rear surface 264 of fixed scroll 26 by fixing bolt 51. Discharge reed valve 131 includes a sealing portion 131a for sealing discharge hole 263, a base portion 131c fixed to fixing bolt 51, and a intermediate portion 131b that connects sealing portion 131a to base portion 131c. When the compressor is not in operation, sealing portion 131a of discharge reed valve 131 remains in contact with rear surface 264 to close discharge hole 263.

Intermediate portion 131a of discharge reed value 131 extends from one end of sealing portion 131a to base portion 131c in a sloped manner. Base portion 131c of discharge reed valve 131 is offset from sealing portion 131a and includes a hole for penetration by fixing bolt 51. Discharge reed valve 31 and supporting reed member 61 are secured to circular end plate 264 and are separated by spacer 52. Supporting reed member 61 may be made of a material and may have a shape and thickness that are similar to those of discharge reed valve 131. The material, shape, and thickness of discharge reed valve 131 and supporting reed member 61 are designed so that the spring constant of discharge reed valve 31 and supporting reed member 61 have suitable values to enhance the cooperation of discharge reed valve 31 and supporting reed member 61.

Further, discharge reed valve 131 slides relative to supporting reed member 61 when they bend to open and close discharge hole 263. In this arrangement, discharge reed valve 131 bends as it opens and closes discharge hole 263 with point F as its fulcrum, while supporting reed member 61 bends as it opens and closes discharge hole 263 with point E as its fulcrum. Therefore, if discharge reed valve 131 bends the same amount as discharge reed valve 31 of the prior art, distance discrepancy "d" increases in comparison with that of the first embodiment.

As a result, discharge reed valve 131 slides on supporting reed member 61 more easily than in discharge reed valve 31 of the first embodiment. Friction forces that are created by the sliding of discharge reed valve 131 and supporting reed member 61, or by the viscosity of the lubricating oil, further dampen the movement of discharge reed valve 31 against the force of the gas, spring force, and the negative pressure applied to discharge reed valve 131, when compared with the first embodiment.

Figure 8:
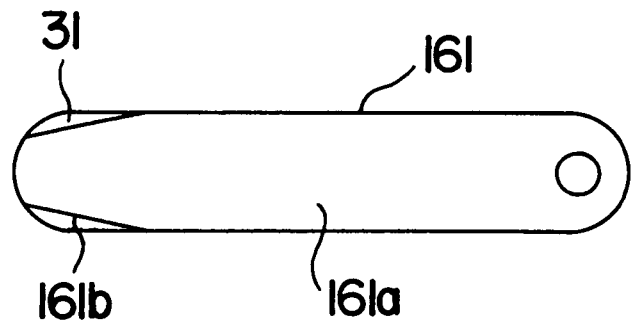
FIG. 8 is a plane view of a discharge valve assembly in accordance with a third embodiment of the present invention.

FIG. 8 illustrates a third embodiment of the present invention. In the discharge reed valve assembly, supporting reed member 161 preferably includes a convergent portion 161b formed at the free end thereof and main portion 161a which is secured to circular end plate 261 together with discharge reed valve 31 by fixing bolt 51. Convergent portion 161b of supporting reed member 161 is formed such that the width of its surface becomes narrower toward the end of supporting reed member 161.

Therefore, the overlapped area, which discharge reed valve 131 and supporting reed member 161 create by overlapping each other, increases as supporting reed member 161 bends away from rear surface 264. Therefore, the damping force, by which supporting reed member 161 dampens the movement of discharge reed valve 31 against the force of the gas, spring force, and the negative pressure applied to discharge reed valve 31, gradually increases. Specifically, the increase in the damping force of supporting reed member 161 counters the increases of recoil spring force of discharge reed valve 31, which is proportional to the amount bending of discharge reed valve 31. As a result, supporting reed member 161a, having a suitable damping force which dampens the unfavorable movement of discharge reed valve 31, may be provided.

Figure 9:
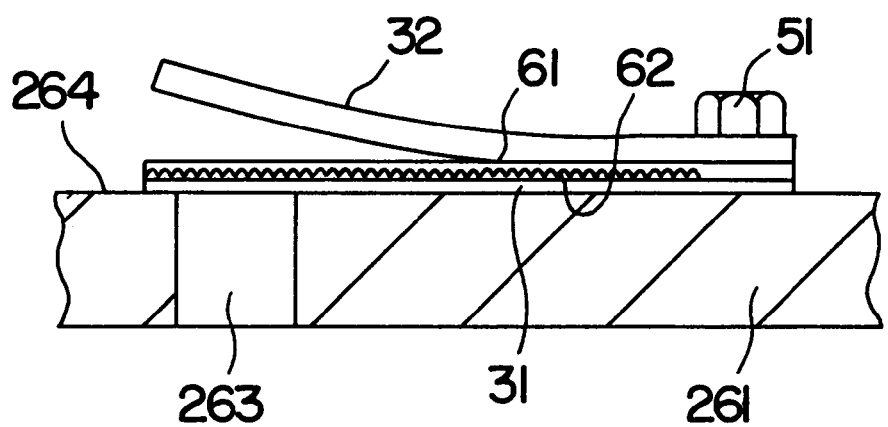
FIG. 9 is an enlarged sectional view of a discharge valve assembly in accordance with a fourth embodiment of the present invention.

FIG. 9 illustrates a fourth embodiment of the present invention. Supporting reed member 61 preferably includes a rough surface 62 formed on one end surface thereof. Rough surface 62 faces one end surface of discharge reed valve 31. In one embodiment, discharge reed valve 31 may include a rough surface formed on one end surface thereof.

Frictional force, which is caused by the sliding of one end surface of discharge reed valve 31 and one end surface of supporting reed member 61, and influenced by viscosity of the lubricating oil included, increases when compared with the first embodiment. Specifically, the damping force, which supporting reed member 61 provides by dampening the movement of discharge reed valve 31 caused by the force of the gas, spring force, and negative pressure that is applied to reed valve 31 to close discharge hole 263, increases when compared to the first embodiment.

In another embodiment, supporting reed members 61 having a suitable damping force for dampening the movement of discharge reed valve 31 in a manner similar to the third embodiment may be provided.

The same advantages are realized in this embodiment as in the first embodiment, so a discussion of those advantages of those embodiments is omitted.

Although the present invention has been described in connection with the preferred embodiments, the invention is not limited thereto. It will be easily understood by those of ordinary skill in the art that variations and modifications may be made within the scope of this invention as defined by the appended claims. Thus, while the preferred embodiments illustrate the invention in a particular type of fluid displacement apparatus, i.e., a scroll-type compressor, this invention could be used in any other type of fluid displacement apparatus, such as a slant plate or a wobble plate-type fluid displacement apparatus.

I claim:

1. A discharge valve assembly for use in a fluid displacement apparatus having a suction chamber and a compression chamber on one side of a valve plate, a discharge chamber on an opposite side of said valve plate, and a passage formed in said valve plate and extending between said compression chamber and said discharge chamber, said passage having an open end through which discharge fluid flows through said assembly comprising:

an elastic valve member disposed on said valve plate and secured to said valve plate at one end thereof, said elastic valve member capable of bending to open and close said passage; and stabilizing means disposed on said elastic valve member and having a surface in contact with a surface of said elastic valve member, said surfaces sliding against each other in a direction parallel to said contact surface;

said stabilizing means configured to create a friction force and a viscous force between said surfaces, said friction forced viscous force operative to stabilize movement of said elastic valve member.

2. The discharge valve assembly of claim 1, wherein said stabilizing means comprises an elastic reed member secured to said valve plate at one end thereof and capable of bending together with said elastic valve member.

3. The discharge valve assembly of claim 2, wherein said elastic reed member overlaps one surface of said elastic valve member during operation of said elastic valve member.

4. The discharge valve assembly of claim 3, wherein said elastic reed member has a shape that is different from that of said elastic valve member so that an area in which said elastic reed member overlaps said elastic valve member varies according to a movement of said elastic valve member.

5. The discharge valve assembly of claim 4, wherein said shape of said elastic reed member has a width that becomes narrower approaching a free end of said elastic valve member.

6. The discharge valve assembly of claim 3, wherein said elastic reed member is made of a material that is different from that of said elastic valve member.

7. The discharge valve assembly of claim 3, wherein said elastic reed member has a thickness that is different from that of said elastic valve member.

8. The discharge valve assembly of claim 3, wherein said elastic reed member has a shape, a material and a thickness the same as those of said elastic valve member.

9. The discharge valve assembly of claim 3, wherein said elastic reed member is secured to said valve plate at an end and in a same place that said elastic valve member is secured to said valve plate.

10. The discharge valve assembly of claim 3, wherein said elastic reed member includes an end surface in contact with said elastic valve member, said end surface having a roughened surface.

11. The discharge valve assembly of claim 3, wherein said elastic valve member has an end surface, which is in contact with said elastic reed member, having a roughened surface.

12. The discharge valve assembly of claim 1, wherein said discharge reed valve assembly includes a valve retainer member secured to said valve plate for limiting a bending movement of said elastic valve member.

13. A discharge valve assembly for use in a fluid displacement apparatus having a suction chamber and a compression chamber on one side of a valve plate, a discharge chamber on an opposite side of said valve plate, and a passage formed in said valve plate and extending between said compression chamber and said discharge chamber, said passage having an open end through which discharge fluid flows through said assembly comprising:

an elastic valve member disposed on said valve plate and secured to said valve plate at one end thereof, said elastic valve member capable of bending to open and close said passage; and stabilizing means disposed on said elastic valve member for stabilizing a movement of said elastic valve member, said stabilizing means comprising an elastic reed member secured to said valve plate at one end thereof and capable of bending together with said elastic valve member, wherein said elastic reed member overlapping one surface of said elastic valve member during operation of said elastic valve member and said elastic reed member is secured to said valve plate at its one end different from a place in which said elastic valve member is secured to said valve plate.

* * * * *